United States Patent [19]
Goodwin, III et al.

[11] Patent Number: 5,729,696
[45] Date of Patent: Mar. 17, 1998

[54] TRANSACTION DATA RECOVERY SYSTEM AND METHOD

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 490,042

[22] Filed: Jun. 13, 1995

[51] Int. Cl.⁶ .................................................. G06F 151/00
[52] U.S. Cl. ...................................... 395/222; 395/182.04
[58] Field of Search ................................. 395/220, 221-2, 395/216, 182.02-182.06, 182.13, 182.19, 185.05-185.07; 235/383, 385

[56] References Cited

U.S. PATENT DOCUMENTS

| | | | |
|---|---|---|---|
| 4,841,442 | 6/1989 | Hosoyama | 364/405 |
| 4,888,709 | 12/1989 | Revesz et al. | 364/518 |
| 5,060,185 | 10/1991 | Naito et al. | 364/900 |
| 5,079,740 | 1/1992 | Patel et al. | 364/900 |
| 5,454,099 | 9/1995 | Myers et al. | 395/575 |
| 5,532,465 | 7/1996 | Waterhouse et al. | 235/383 |
| 5,537,312 | 7/1996 | Sekiguchi et al. | 364/410 R |

*Primary Examiner*—Gail O. Hayes
*Assistant Examiner*—Junghoon Kenneth Oh
*Attorney, Agent, or Firm*—Paul W. Martin

[57] ABSTRACT

A transaction data recovery system and method which provide backups for the primary price look-up (PLU) data file and the primary electronic price label (EPL) data file. The transaction system includes an electronic price label system and a point-of-service system. Under an EPL system data recovery method, primary and backup EPL data files are provided. The backup EPL data file is loaded by a computer terminal upon a loss of the primary EPL data file. Finally, the backup EPL data file is modified if the backup EPL data file lacks information on at least one of the EPLs within the system. Under a price data recovery method, primary and backup PLU data files are provided. The backup PLU data file is loaded by a computer terminal upon a loss of the primary PLU data file. Price verifier information located within an EPL data file is modified if at least one of the EPLs within the system fails to display the price within the backup PLU data file.

21 Claims, 6 Drawing Sheets

TRANSACTION DATA RECOVERY SYSTEM AND METHOD

BACKGROUND OF THE INVENTION

The present invention relates to electronic price label (EPL) systems, and more specifically to a transaction data recovery system and method.

In a traditional retail store, bar code scanners rely on price information maintained within a price-lookup (PLU) file. The PLU file is typically stored in a single location at host server.

EPL systems typically include a plurality of EPLs for each item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information, EPL merchandise item information, and price verifier information, such as a checksum value. Price information displayed by the EPLs is obtained from the PLU file.

The worst situation that can occur in an EPL system is the corruption or loss of the EPL data file. Since the EPL data file identifies EPLs within the system, this situation effectively results in the loss of every EPL in the system.

Loss of the EPL data file may be a partial or full loss. A partial loss occurs when the EPL data file is partially or totally recoverable, which may happen, for example, if file and directory information on the storage medium is lost, or if the EPL data file is corrupted. A full loss occurs when the EPL data file is unrecoverable, which would happen if the storage medium mechanically fails in a catastrophic way.

EPL systems today must be totally reconfigured if the EPL data file is fully lost. The current method for recovering from such a loss is to manually fill with EPL data using a keyboard.

Another serious problem is the loss of the PLU data file. This situation also effectively results in the loss of the EPLs, since all price data which is displayed by the EPLs comes from the PLU data file. Like the loss of the EPL data file, loss of the PLU data file may be partial or full.

Therefore, it would be desirable to provide a transaction data recovery system and method to minimize down time of retail systems having EPL systems when either a loss of the EPL data file or PLU data file occurs.

SUMMARY OF THE INVENTION

In accordance with the teachings of the present invention, a transaction data recovery system and method are provided. The transaction system includes an electronic price label system and a point-of-service system.

An electronic price label (EPL) system data recovery method reestablishes EPL information by providing a backup EPL data file. A primary EPL data file containing a list of items and information identifying EPLs associated with the items is provided. The primary EPL data file changes over time as new EPLs are removed and added to the system. A backup EPL data file containing another list of items and information identifying EPLs associated with the items is provided by copying the primary EPL data file at a predetermined point in time. The backup EPL data file is loaded by a computer terminal upon a loss of the primary EPL data file. The method determines whether the backup EPL data file contains information on all of the EPLs within the system. Finally, the backup EPL data file is modified if the backup EPL data file lacks information on at least one of the EPLs within the system.

A price data recovery method reestablishes price information to an EPL system by providing a backup price look-up (PLU) data file. A primary PLU data file containing a list of items and prices for the items is provided. The primary PLU data file changes over time as new items are removed and added to the system, and prices displayed by EPLs within the EPL system come from the primary PLU data file. A backup PLU data file containing another list of items and prices for the items is provided by copying the primary PLU data file at a predetermined point in time. The backup PLU data file is loaded by a computer terminal upon a loss of the primary PLU data file.. The method determines whether the prices displayed by the EPLs within the EPL system are equal to the prices in the backup PLU file. Finally, price verifier information associated with the EPLs and located within an EPL data file is modified if at least one of the EPLs within the system fails to display the price within the backup PLU data file.

An EPL system includes a computer terminal, a plurality of EPLs coupled to the computer terminal for displaying prices of items, a primary EPL storage medium coupled to the computer terminal containing a primary EPL data file which contains a list of items and information identifying EPLs associated with the items in the list, and a backup EPL storage medium coupled to the computer terminal containing a backup EPL data file containing another list of items and information identifying EPLs associated with the items in the other list. The primary EPL data file changes over time as new EPLs are removed and added to the EPL system, and the backup EPL data file is a copy of the primary EPL data file at a predetermined point in time. The computer terminal loads the backup EPL data file upon a failure of the primary storage means, sends an instruction to the EPLs identified within the backup EPL data file to provide an indication to an operator that the EPLs have received the instruction so as to determine whether the backup EPL data file contains information on all of the EPLs within the EPL system, and modifies EPL identification information in the backup EPL data file if the backup EPL data file lacks information on at least one of the EPLs within the system.

A transaction management system includes a price maintenance system and an EPL system. The price maintenance system includes a price maintenance terminal, a primary PLU storage medium coupled to the price maintenance terminal containing a primary PLU data file which contains a list of items and prices for the items, and a backup PLU storage medium coupled to the price maintenance terminal containing a backup PLU data file which contains another list of items and prices for the items and which is a copy of the primary PLU data file at a predetermined point in time. The primary PLU data file changes over time as new items are removed and added to the system and prices displayed by EPLs within the EPL system come from the primary PLU data file.

The EPL system includes an EPL computer terminal, a plurality of EPLs coupled to the EPL computer terminal for displaying prices of items, and an EPL storage medium coupled to the EPL computer terminal containing an EPL data file which contains a list of the items, information identifying the EPLs associated with the items, and EPL price verifier information.

The EPL terminal executes a price verifier application which verifies the displayed price of an EPL without the need for a visual inspection of the EPL. The price verifier application reads the EPL data file, examines an entry ITEM ID, reads the primary PLU data file, reads the line entry in the primary PLU data file having the same ITEM ID entry as the one read from the EPL data file, and examines an entry PLU PRICE in the line entry from the PLU data file. The price verifier application calculates a checksum value for the entry PLU PRICE and compares the calculated checksum value for entry PLU PRICE with the entry EPL CHECK. If the calculated checksum value is not the same as the EPL CHECK entry, the price for the item having ITEM ID is not the same in both the EPL data file and the primary PLU data file. The price verifier application generates a price change request for changing the displayed price to the PLU price and updates the checksum value in entry EPL CHECK in the EPL data file.

It is accordingly an object of the present invention to a transaction data recovery system and method.

It is another object of the present invention to provide a transaction data recovery system and method which provide backups for the primary PLU data file and the primary EPL data file. If the primary EPL data file were lost, a system without a backup would not know that any EPLs are part of the system. If a primary PLU data file were lost, a system without a backup would not know any prices to display on the EPLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
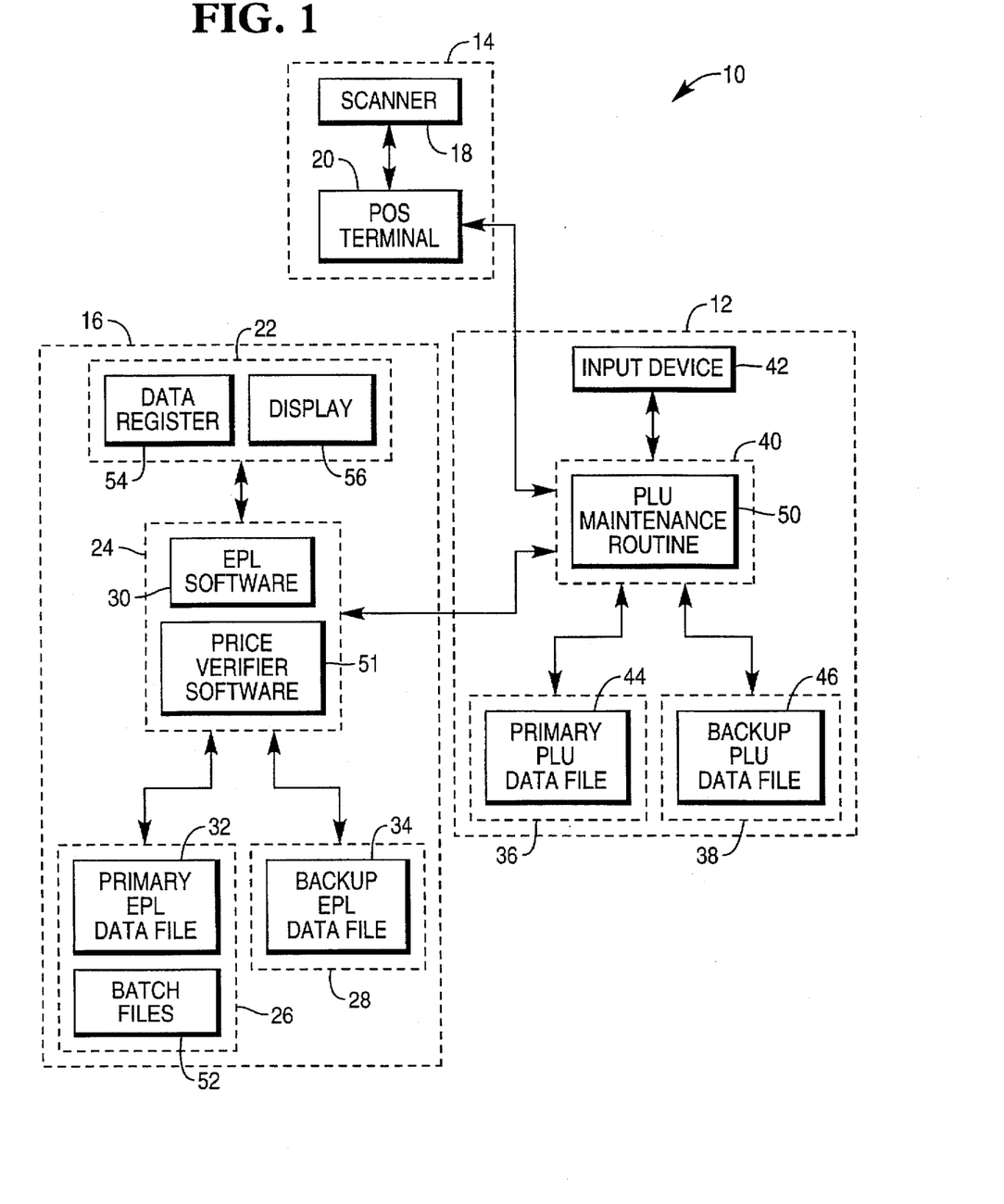
FIG. 1 is a block diagram of retail system.

Referring now to FIG. 1, store system 10 primarily includes host computer system 12, point-of-service (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code scanner 18 and terminal 20.

EPL system 16 primarily includes EPLs 22, host EPL terminal 24, primary EPL storage medium 26, and backup EPL storage medium 28.

EPLs 22 include a data register 54 and a display 56. Data registers 54 contain data, usually price data, sent from EPL software 30. The data is typically displayed by displays 56.

Host EPL terminal 24 executes EPL software 30 and price verifier software 51. EPL software 30 is responsible for making changes to the configuration information of EPL system 16 stored within primary EPL data file 32, for making changes in the price information displayed by EPLs 22, for preparing EPL system 16 for loss of primary EPL data file 32, and for executing EPL transaction system data recovery procedures.

EPL software 30 obtains prices in primary PLU file 44 as they are entered in input device 42 (immediate processing) or after they have been stored within primary PLU data file 44. In the first instance, EPL software 30 calculates new price checksums and applies them one by one to EPL data file 32. In the second instance, EPL software 30 calculates new prices checksums, creates a batch file of checksum changes, and applies the changes by executing the batch (batch processing).

Price verifier software 51 verifies that the price displayed by EPLs 22 is equal to the price within PLU file 44. Price verifier software 51 preferably generates a price change request for EPLs that are displaying incorrect prices.

Primary EPL storage medium 26 stores primary EPL data file 32 and is preferably a fixed disk drive. Primary EPL data file 32 contains EPL identification and price checksum information. Price checksum information is calculated from price information in primary PLU file 44.

Backup EPL storage medium 28 stores backup EPL data file, which is a periodically made copy of primary EPL data file 32. Backup EPL storage medium 28 may be a fixed disk drive or a backup tape.

Host computer system 12 includes primary PLU storage medium 36, backup PLU storage medium 38, host PLU terminal 40, and input device 42.

Primary PLU storage medium 36 stores primary PLU file 44. PLU file 22 is available for distribution to POS terminal 20. Alternatively, provision may be made for direct access to primary PLU file 44 by bar code scanner 18.

Backup PLU storage medium 38 stores backup PLU file 46, which is a periodically made copy of primary PLU file 44. Backup PLU storage medium 38 may be a fixed disk drive or a backup tape.

Host PLU terminal 40 (PLU) maintenance application 48, which includes PLU maintenance routine 50. PLU maintenance routine 50 updates primary PLU file 44, prepares system 12 for a loss of primary PLU data file 44, and for executing PLU transaction system data recovery procedures.

Input device 42 is preferably a keyboard.

Figure 2:
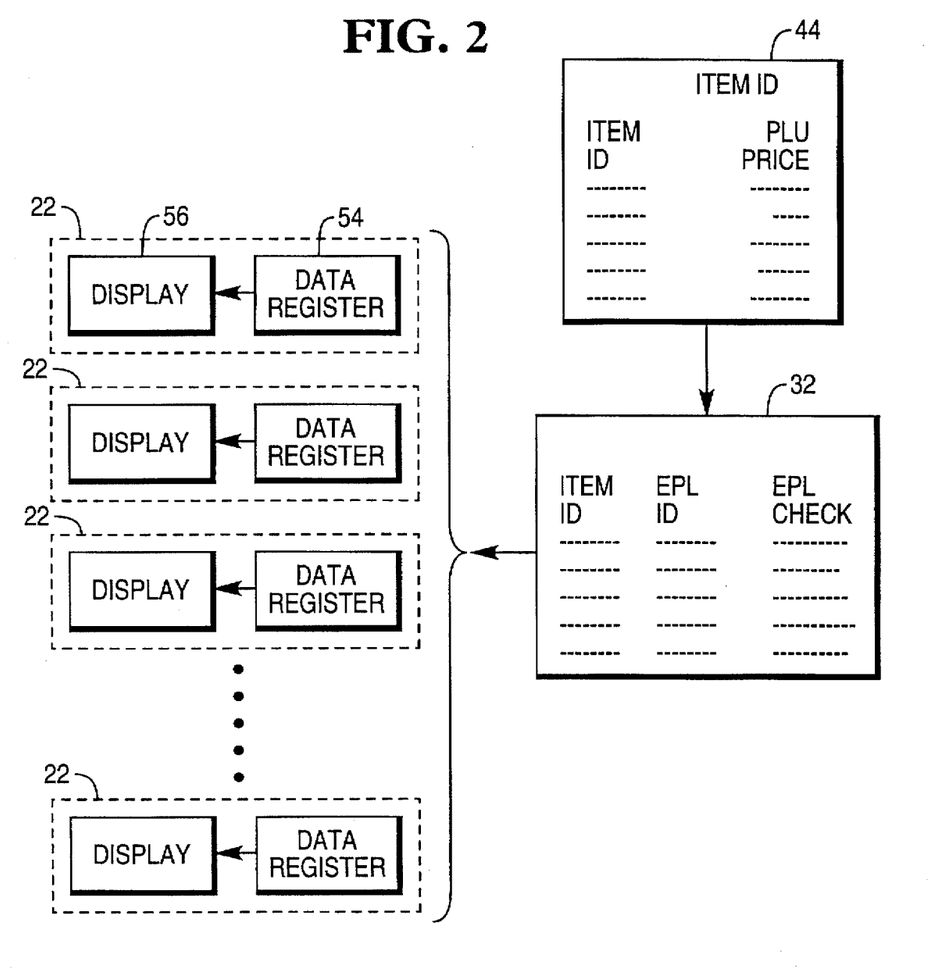
FIG. 2 is a diagram of an EPL data file and a PLU file.

Turning now to FIG. 2, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

PLU data file 44 includes a line entry for each item sold in the store. Each line entry has an item identification entry (ITEM ID), and a PLU price entry (PLU PRICE).

Entry ITEM ID identifies a store item. Entry PLU PRICE identifies the price read by POS system 14 to determine the price of each item during scanning by bar code scanner 18.

During normal operation, EPL terminal 24 obtains price information from PLU data file 44 and sends it to data register 54. Display 56 displays the price in data register 54. During a price mismatch situation, the price information from PLU data file 44 does not agree with the price displayed by EPL. Price verifier software 51 compares the price within PLU file 44 with the price displayed by EPLs 22 by comparing entry EPL CHECK in EPL data file 32 with a checksum value it generates from the corresponding price in entry PLU PRICE.

Figure 3:
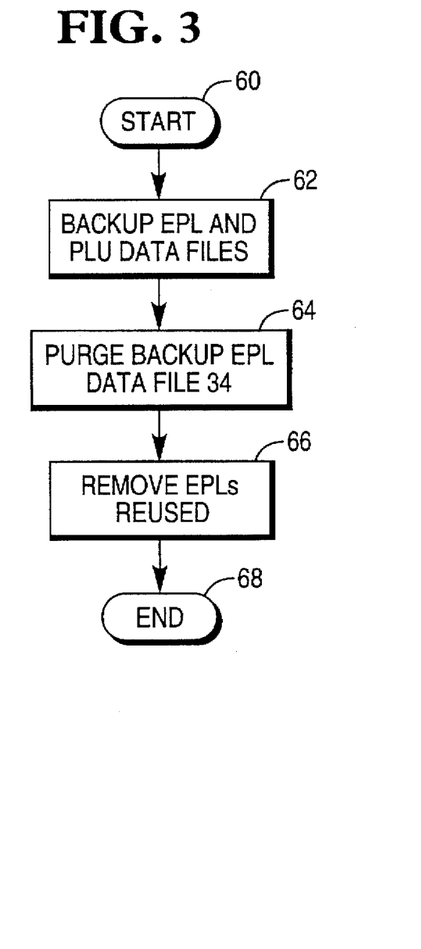
FIG. 3 is a flow diagram of a data loss preparation method.

Turning now to FIG. 3, data loss preparation steps begin with START 60.

In step 62, backup EPL data file 34 is regularly made and stored in backup EPL storage medium 28. Backup PLU file 46 is regularly made and stored in backup PLU storage medium 38.

In step 64, EPL batch files 52 are only purged after backup EPL data file 34 is created.

In step 66, EPLs removed from EPL system 16 are not reused until backup EPL data file 34 is made. This eliminates the possibility of having an EPL 22 identified in primary EPL data file 32 that is associated with a wrong (previous) item within primary PLU file 44.

The preparation method ends at step 68.

Figure 4:
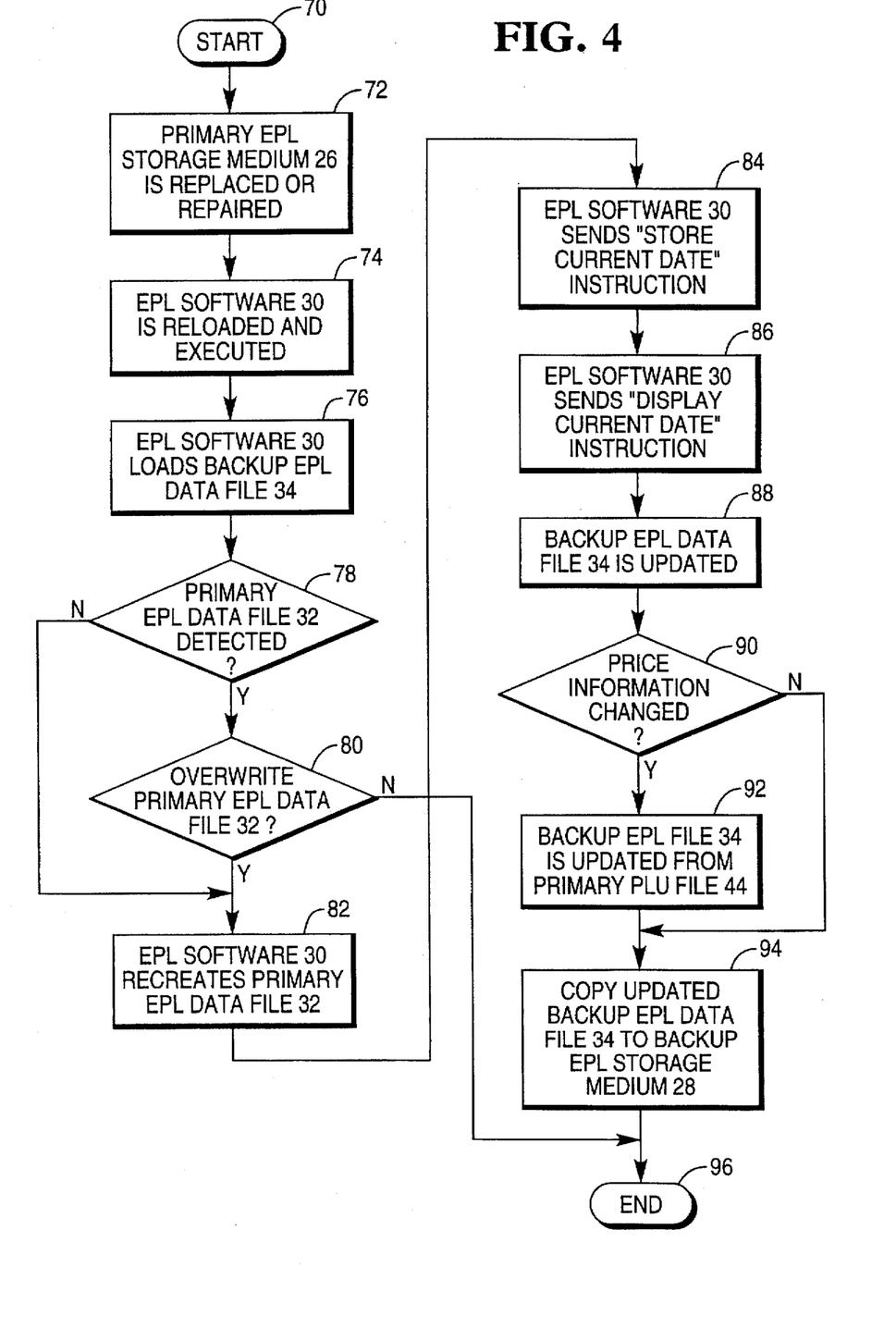
FIG. 4 is a flow diagram illustrating a method for responding to a failure of a primary EPL storage medium.

Turning now to FIG. 4, a method for responding to a failed primary EPL storage medium 26 begins with START 70. If access to primary EPL storage medium 26 is lost, access to primary EPL data file 32 and EPL software 30 is also lost. If primary EPL storage medium 26 is a fixed disk drive, failure may be caused by improper initialization of the drive or a physical problem with the drive.

In step 72, primary EPL storage medium 26 is replaced or repaired.

In step 74, EPL software 30 is reloaded and executed by EPL terminal 24.

In step 76, EPL software 30 loads backup EPL data file 34.

In steps 78 and 80, EPL software 30 asks the user whether replacement of primary EPL data file 32 should be completed if it detects primary EPL data file 32 (storage medium 26 is repaired). If the user does not wish to overwrite primary EPL data file 32, the method ends at step 96.

If the user chooses to overwrite primary EPL data file 32 with backup EPL data file 34, or if primary EPL storage medium 26 has been replaced, EPL software 30 quickly recreates primary EPL data file 32 from backup EPL data file 34 in step 82.

In step 84, EPL software 30 sends a message to individual EPLs identified within backup EPL data file 34 to store the current date data register 54 of EPLs 22.

In step 86, EPL software 30 sends a message to all EPLs to display the contents of the date register 54 for inspection by the user. A visual check of EPLs is conducted. EPLs not displaying the current date are EPLs that were added or removed between the time that backup EPL data file 34 was created and the time that primary EPL data file 32 was lost.

In step 88, backup EPL data file 34 is updated by adding EPL identification information and price checksums for those EPLs that were added and removing EPL information for those EPLs that were removed. The updating process may be performed one EPL at a time, or by creating a batch file 52 of EPL update information.

In step 90, EPL software 30 determines whether the price information for the identified EPLs changed between the time backup EPL data file 34 was created and the loss of primary EPL data file 32. The price information for each EPL is compared with the corresponding price information in primary PLU file 44.

If changes occurred, EPLs having out-of-date price information in backup EPL data file 34 are updated from primary PLU file 44 by EPL software 30 in step 92.

In step 94, the updated backup EPL data file becomes primary EPL data file 32 and is copied to backup EPL storage medium 34 to create a new backup EPL data file 34.

The method ends at step 96.

Figure 5:
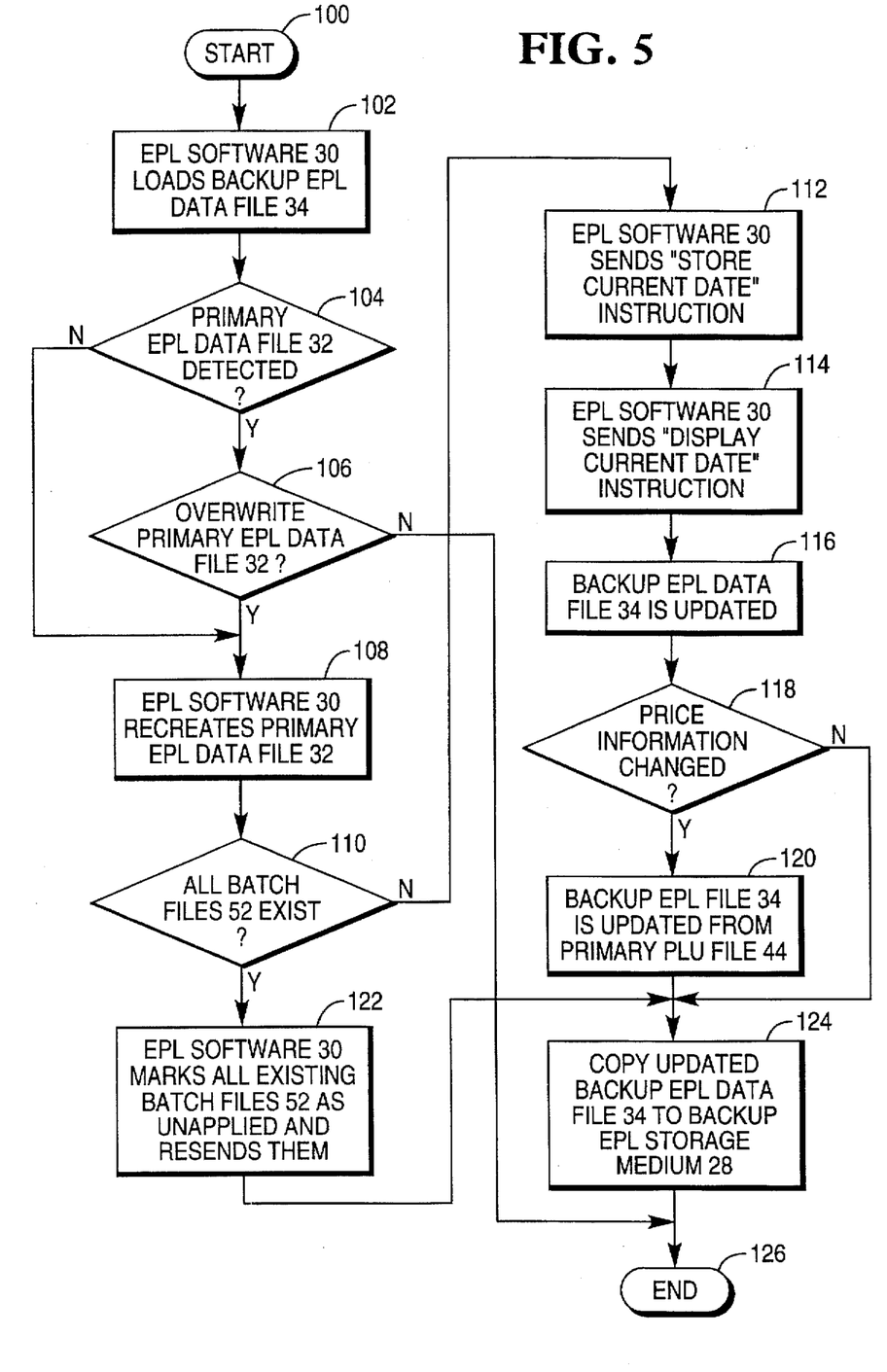
FIG. 5 is a flow diagram illustrating a method for responding to a loss or corrupted primary EPL file.

Referring now to FIG. 5, a method for responding to a lost or corrupted primary EPL file 32 begins with START 100. Loss of primary EPL data file 32 may be caused by a defect in primary EPL storage medium 26, corruption of all or part of primary EPL data file 32, or overwriting of primary EPL data file 32 with a previous file.

In step 102, EPL software 30 loads backup EPL data file 34.

In steps 104 and 106, EPL software 30 asks the user whether replacement of primary EPL data file 32 should be completed if it detects primary EPL data file 32. If the user does not wish to overwrite primary EPL data file 32, the method ends at step 126.

If the user chooses to overwrite primary EPL data file 32 with backup EPL data file 34, or if primary EPL data file 32 does not exist, EPL software 30 quickly recreates primary EPL data file 32 from backup EPL data file 34 in step 108.

In step 110, EPL software 30 determines whether all of batch files 52 since backup EPL data file 34 was created still exist. If they do, the method proceeds to step 122.

If all of batch files 52 do not exist, EPL software 30 sends a message to EPLs identified within backup EPL data file 34 to store the current date data register 54 of EPLs 22 in step 112.

In step 114, EPL software 30 sends a message to the identified EPLs to display the contents of the date register 54 for inspection by the user. EPLs not displaying the current date are EPLs that were added or removed between the time that backup EPL data file 34 was created and the time that primary EPL data file 32 was lost.

In step 116, backup EPL data file 34 is updated by adding EPL identification information and price for those EPLs that were added and removing EPL information for those EPLs that were removed. The updating process may by performed one EPL at a time, or after creating a batch of EPL update information.

In step 118, EPL software 30 determines whether the price information for the identified EPLs changed between the time backup EPL data file 34 was created and the loss of primary EPL data file 32. The price information for each EPL is compared with the corresponding price information in primary PLU file 44.

If changes occurred, EPLs having out-of-date price information in backup EPL data file 34 are updated from primary PLU file 44 by EPL software 30 in step 120. The method jumps to step 124.

Proceeding from step 110 to step 122, EPL software 30 marks all existing batch files 52 as unapplied and resends them in by date from earliest to latest.

In step 124, the updated backup EPL data file becomes primary EPL data file 32 and is copied to backup EPL storage medium 34 to create a new backup EPL data file 34.

The method ends at step 126.

Figure 6:
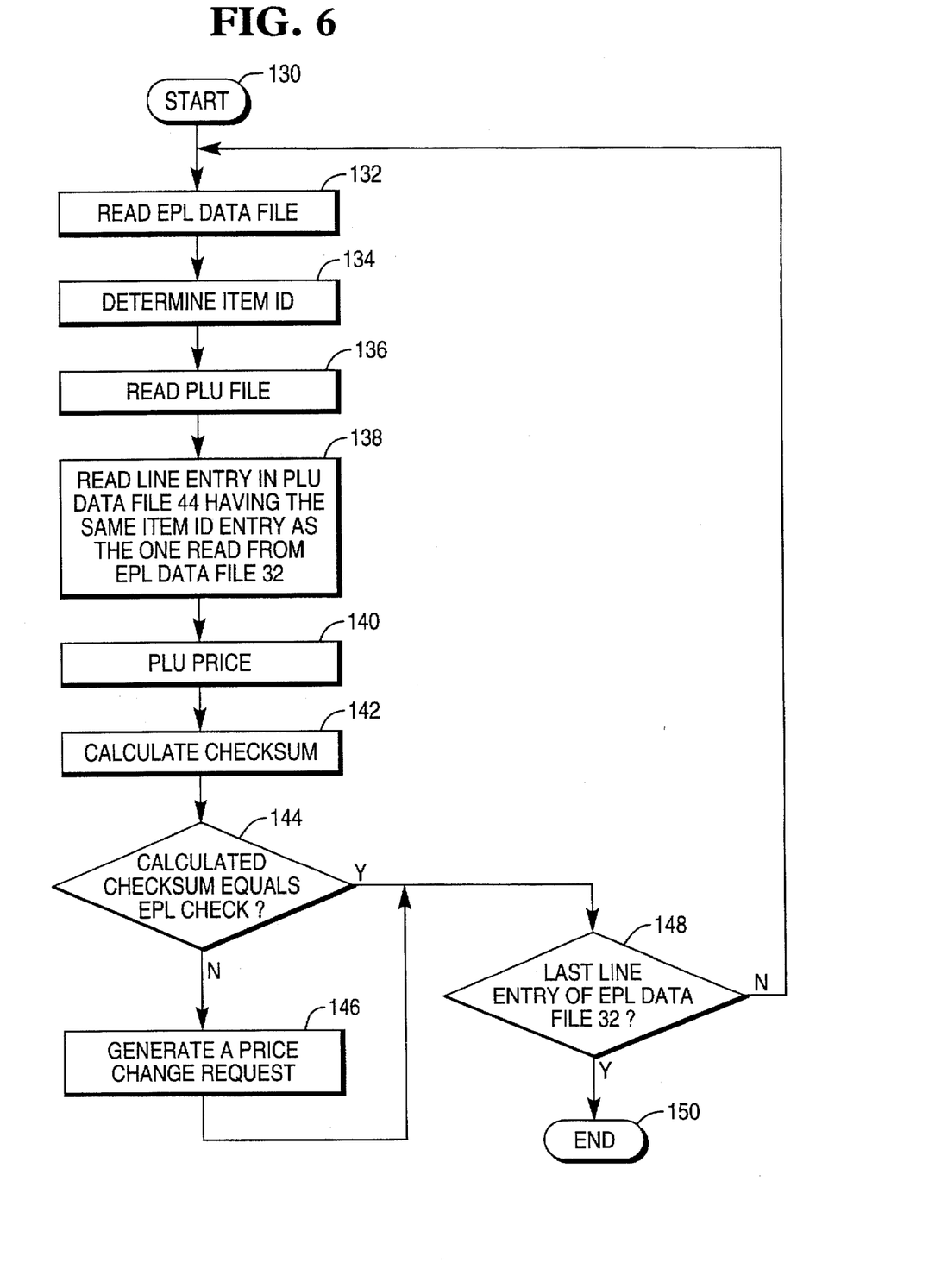
FIG. 6 is a flow diagram illustrating the operation of price verifier application.

Turning now to FIG. 6, price verifier software 51 is explained in more detail, beginning with START 130.

In step 132, price verifier software 51 reads EPL data file 32.

In step 134, price verifier software 51 examines entry ITEM ID.

In step 136, price verifier software 51 reads PLU data file 44.

In step 138, price verifier software 51 reads the line entry in PLU data file 44 having the same ITEM ID entry as the one read from EPL data file 32.

In step 140, price verifier software 51 examines entry PLU PRICE in the line entry from PLU data file 44.

In step 142, price verifier software 51 calculates a checksum value for PLU PRICE.

In step 144, price verifier software 51 compares the calculated checksum value for entry PLU PRICE with the entry EPL CHECK. If the calculated checksum value is not the same as the EPL CHECK entry, the price for the item having ITEM ID is not the same in both EPL data file 32 and PLU data file 44. Price mismatch has occurred between the price for the item displayed by its EPL and the price that would be tallied by POS system 14.

In step 146, price verifier program 51 generates a price change request for changing the displayed price to the PLU price and updates the checksum value in entry EPL CHECK in EPL data file 32. This request may by an immediate request or part of a batch of requests stored in batch price change file 52.

In step 148, the method determines whether the last line entry of EPL data file 32 has been read. If so, the method ends at step 150. If not, the method returns to step 132 to read another line entry from EPL data file 32.

Returning to step 144, if the calculated checksum value is the same as the EPL CHECK entry, the price for the item having ITEM ID is the same in both EPL data file 32 and PLU data file 44. Price mismatch has not occurred between the price for the item displayed by its EPL and the price that would be tallied by POS system 14. The method proceeds to step 148.

Figure 7:
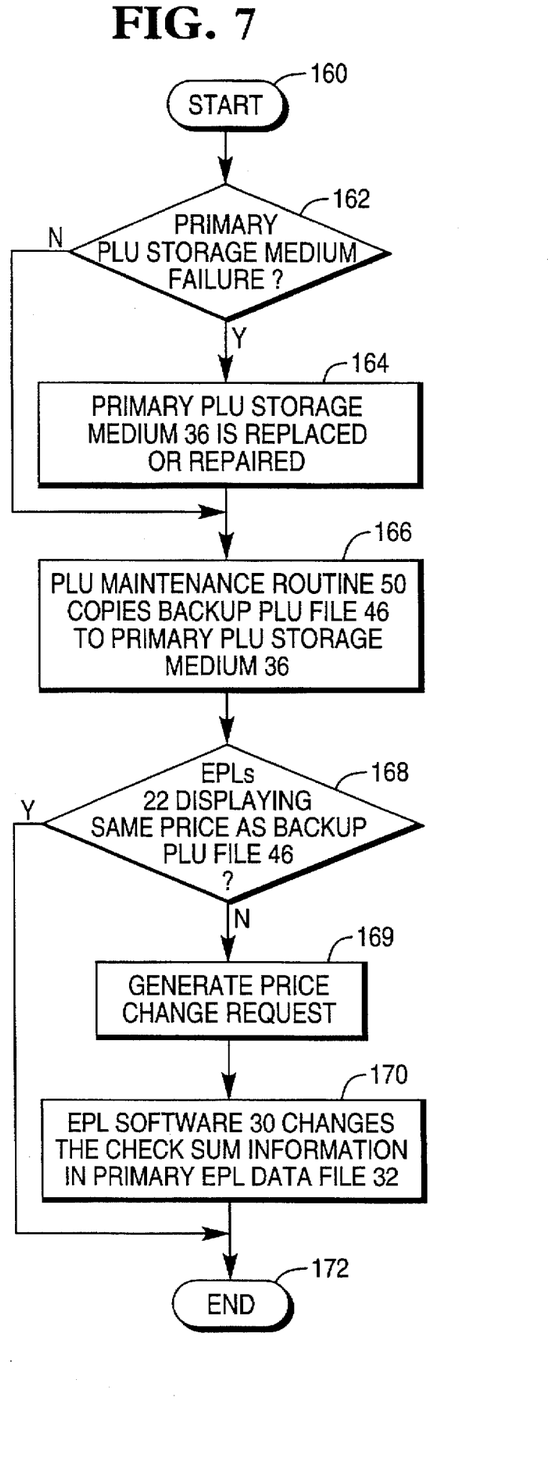
FIG. 7 is a flow diagram illustrating a method for responding to a loss or corrupted primary PLU file.

Referring to FIG. 7, a method for responding to a lost or corrupted primary PLU file 44 begins with START 160. Price information displayed by EPLs 22 is stored within primary PLU file 44. Failure may be caused by a failure of primary PLU storage medium 36 or corruption of primary PLU file 44.

In step 162, PLU maintenance routine 50 determines whether loss of primary PLU file was caused by loss of primary PLU storage medium 36. If so, primary PLU storage medium 36 is replaced in step 164 and the method continues to step 166.

If not, the method proceeds to step 166 in which PLU maintenance routine 50 copies backup PLU file 46 to primary PLU storage medium 36.

In step 168, EPL software 30 compares backup PLU file 46 with primary EPL data file 32 to determine if EPLs 22 are displaying the same price listed in backup PLU file 46. EPL software 30 calculates checksums for the prices listed in backup PLU file 46 and compares the calculated checksums to the checksums listed in primary EPL data file 32.

If an EPL is displaying a different price, EPL software 30 generates a price change request in step 169, and changes the existing checksums in primary EPL data file 32 to the calculated checksums in step 170 and the method ends in step 172.

Otherwise, the method ends in step 172.

Although the present invention has been described with particular reference to certain preferred embodiments thereof, variations and modifications of the present invention can be effected within the spirit and scope of the following claims.

What is claimed is:

1. An electronic price label (EPL) system data recovery method comprising the steps of:

(a) providing a primary EPL data file containing a list of items and information identifying EPLs associated with the items, wherein the primary EPL data file changes over time as new EPLs are removed and added to the system;

(b) providing a backup EPL data file containing another list of items and information identifying EPLs associated with the items by copying the primary EPL data file at a predetermined point in time;

(c) loading the backup EPL data file by a computer terminal upon a loss of the primary EPL data file;

(d) determining whether the backup EPL data file contains information on all of the EPLs within the system; and (e) modifying the backup EPL data file if the backup EPL data file lacks information on at least one of the EPLs within the system.

2. The method as recited in claim 1, wherein step (a) comprises the substeps of:

(a-1) providing a primary storage medium coupled to the terminal;

(a-2) creating the primary EPL data file by EPL software executed by the terminal; and (a-3) storing the primary EPL data file in the primary storage medium by the EPL software.

3. The method as recited in claim 2, wherein step (b) comprises the substeps of:

(b-1) providing a backup storage medium coupled to the terminal; and (b-2) copying the primary EPL data file from the primary storage medium to the backup storage medium to create the backup EPL data file.

4. The method as recited in claim 1, wherein step (d) comprises the substep of:

(d-1) sending an instruction by the terminal to the EPLs identified within the backup EPL data file to provide an indication to an operator that the EPLs have received the instruction.

5. The method as recited in claim 4, wherein step (d-1) comprises the substeps of:

(d-1-A) sending an instruction to the EPLs identified within the backup EPL data file to store a common date in a data register in the EPLs; and (d-1-B) sending an instruction to the EPLs identified within the backup EPL data file to display the common date.

6. The method as recited in claim 4, wherein step (e) comprises the substep of:

(e-1) changing EPL identification information in the backup EPL data file for the one EPL by the terminal if the one EPL fails to provide the indication to the operator.

7. The method as recited in claim 6, wherein step (e-1) comprises the substeps of:

(e-1-A) deleting EPL identification information for the one EPL if it is faulty; and (e-1-B) adding EPL identification information for a new EPL which replaces the one EPL.

8. The method as recited in claim 6, wherein step (e-1) comprises the substep of:

(e-1-A) adding EPL identification information for a new EPL that was added after the backup EPL data file was created.

9. The method as recited in claim 1, wherein the loss of the primary EPL data file is caused by corruption of the primary EPL data file.

10. The method as recited in claim 1, wherein the loss of the primary EPL data file is caused by a failure of the primary storage medium.

11. An electronic price label (EPL) system data recovery method comprising the steps of:

(a) providing a primary EPL data file containing a list of items and information identifying EPLs associated with the items, wherein the primary EPL data file changes over time as new EPLs are removed and added to the system;

(b) providing a backup EPL data file containing another list of items and information identifying EPLs associated with the items by copying the primary EPL data file at a predetermined point in time;

(c) loading the backup EPL data file by a computer terminal upon a loss of the primary EPL data file;

(d) determining whether the backup EPL data file contains information on all of the EPLs within the system, including the substep of sending an instruction by the terminal to the EPLs identified within the backup EPL data file to provide an indication to an operator that the EPLs have received the instruction; and (e) modifying the backup EPL data file if the backup EPL data file lacks information on at least one of the EPLs within the system, including the substep of changing EPL identification information in the backup EPL data file for the one EPL by the terminal if the one EPL fails to provide the indication to the operator.

12. A price data recovery method for a transaction management system having an electronic price label (EPL) system, comprising the steps of:

(a) providing a primary price look-up (PLU) data file containing a list of items and prices for the items, wherein the primary PLU data file changes over time as new items are removed and added to the system, and wherein prices displayed by EPLs within the EPL system come from the primary PLU data file;

(b) providing a backup PLU data file containing another list of items and prices for the items by copying the primary PLU data file at a predetermined point in time;

(c) loading the backup PLU data file by a computer terminal upon a loss of the primary PLU data file;

(d) determining whether the prices displayed by the EPLs within the EPL system are equal to the prices in the backup PLU file; and (e) modifying price verifier information associated with the EPLs and located within an EPL data file if at least one of the EPLs within the system fails to display the price within the backup PLU data file.

13. The method as recited in claim 12 wherein step (a) comprises the substeps of:

(a-1) providing a primary storage medium coupled to the terminal;

(a-2) creating the primary PLU data file by PLU maintenance software executed by the terminal; and (a-3) storing the primary PLU data file in the primary storage medium by the PLU maintenance software.

14. The method as recited in claim 13, wherein step (b) comprises the substeps of:

(b-1) providing a backup storage medium coupled to the terminal; and (b-2) copying the primary PLU data file from the primary storage medium to the backup storage medium to create the backup PLU data file.

15. The method as recited in claim 13, wherein step (d) comprises the substep of:

(d-1) sending an instruction by the terminal to the EPLs identified within the backup EPL data file to display the prices of the items for inspection by an operator.

16. The method as recited in claim 15, wherein step (e) comprises the substeps of:

(e-1) calculating new price verifier information for the one EPL from the price for the corresponding item in the backup PLU data file; and (e-2) replacing the EPL price verifier information for the one EPL with the new price verifier information.

17. The method as recited in claim 12, wherein the loss of the primary PLU data file is caused by corruption of the primary PLU data file.

18. The method as recited in claim 12, wherein the loss of the primary PLU data file is caused by a failure of the primary storage medium.

19. A data recovery method for a transaction management system having an electronic price label (EPL) system, comprising the steps of:

(a) providing a primary price look-up (PLU) data file containing a list of items and prices for the items, wherein the primary PLU data file changes over time as new items are removed and added to the system, and wherein prices displayed by EPLs within the EPL system come from the primary PLU data file;

(b) providing a backup PLU data file containing another list of items and prices for the items by copying the primary PLU data file at a predetermined point in time;

(c) loading the backup PLU data file by a computer terminal upon a loss of the primary PLU data file;

(d) determining whether the prices displayed by the EPLs within the EPL system are equal to the prices in the backup PLU file, including the substep of sending an instruction by the terminal to the EPLs identified within the backup EPL data file to display the prices of the items for inspection by an operator;

(e) modifying price verifier information associated with the EPLs and located within an EPL data file if at least one of the EPLs within the system fails to display the price within the backup PLU data file, including the substeps of calculating new price verifier information for the one EPL from the price for the corresponding item in the backup PLU data file, and replacing the EPL price verifier information for the one EPL with the new price verifier information.

20. An electronic price label (EPL) system comprising:

a computer terminal;

a plurality of EPLs coupled to the computer terminal for displaying prices of items;

a primary EPL storage medium coupled to the computer terminal containing a primary EPL data file which contains a list of items and information identifying EPLs associated with the items in the list, wherein the primary EPL data file changes over time as new EPLs are removed and added to the EPL system; and a backup EPL storage medium coupled to the computer terminal containing a backup EPL data file containing another list of items and information identifying EPLs associated with the items in the other list, wherein the backup EPL data file is a copy of the primary EPL data file at a predetermined point in time;

wherein the computer terminal loads the backup EPL data file upon a failure of the primary storage means, sends an instruction to the EPLs identified within the backup EPL data file to provide an indication to an operator that the EPLs have received the instruction so as to determine whether the backup EPL data file contains information on all of the EPLs within the EPL system, and modifies EPL identification information in the backup EPL data file if the backup EPL data file lacks information on at least one of the EPLs within the system.

21. A transaction management system comprising:

a price maintenance system including
 a price maintenance terminal;
 a primary price look-up (PLU) storage medium coupled to the price maintenance terminal containing a primary price look-up (PLU) data file which contains a list of items and prices for the items, wherein the primary PLU data file changes over time as new items are removed and added to the system, and wherein prices displayed by EPLs within the EPL system come from the primary PLU data file; and
 a backup PLU storage medium coupled to the price maintenance terminal containing a backup PLU data file which contains another list of items and prices for the items and which is a copy of the primary PLU data file at a predetermined point in time; and an electronic price label (EPL) system including
 an EPL computer terminal;
 a plurality of EPLs coupled to the EPL computer terminal for displaying prices of items; and
 an EPL storage medium coupled to the EPL computer terminal containing an EPL data file which contains a list of the items, information identifying the EPLs associated with the items, and EPL price verifier information;

wherein the EPL terminal loads the backup PLU data file upon a loss of the primary PLU data file, sends an instruction to the EPLs identified within the backup EPL data file to display the prices of the items for inspection by an operator to determine whether the prices displayed by the EPLs are equal to the prices for the corresponding items in the backup PLU data file, and modifies the EPL price verifier information within the EPL data file if at least one of the EPLs within the system fails to display the price within the backup PLU data file.

* * * * *